Figure 1:
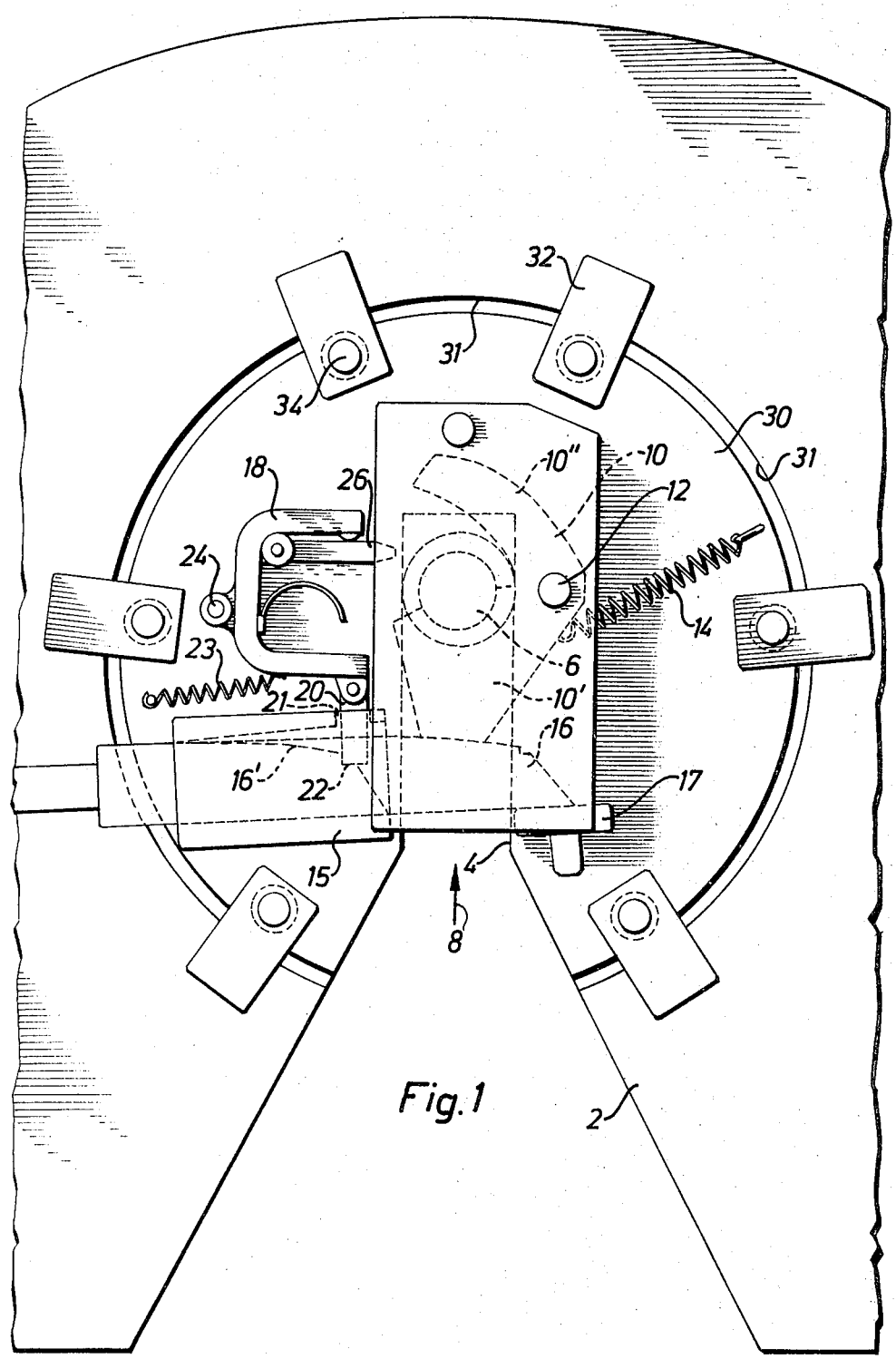

United States Patent [19]
Morichetto

[11] 3,830,523
[45] Aug. 20, 1974

[54] SEMI-TRAILER COUPLING
[75] Inventor: Martin Morichetto, Vargon, Sweden
[73] Assignee: Slapvagskopplingar AB., Vanersborg, Sweden
[22] Filed: Dec. 1, 1972
[21] Appl. No.: 311,126

[30] Foreign Application Priority Data
Dec. 3, 1971 Switzerland .................. 15573/71

[52] U.S. Cl. ............................................ 280/434
[51] Int. Cl. .......................................... B62d 53/12
[58] Field of Search ............ 280/432, 433, 434, 435

[56] References Cited
UNITED STATES PATENTS

| | | | |
|---|---|---|---|
| 3,044,803 | 7/1967 | Wright | 280/433 |
| 3,251,609 | 5/1966 | Daniels | 280/434 |
| 3,314,691 | 4/1967 | Georgi | 280/434 |
| 3,352,571 | 11/1967 | Nelson | 280/435 |
| 3,434,736 | 3/1969 | Lindner | 280/435 |
| 3,600,006 | 8/1971 | Slaven | 280/434 |

Primary Examiner—Leo Friaglia
Assistant Examiner—Randall A. Schrecengost
Attorney, Agent, or Firm—Hane, Baxley & Spiecens

[57] ABSTRACT

The invention relates to a coupling for a semi-trailer. The coupling comprises a coupling platform, adapted to be positioned on a tractor vehicle and comprising a substantially elongated aperture extending from the periphery of the platform in a direction towards the interior of the platform. The aperture at the inner end thereof being adapted to receive a king-pin of the semi-trailer. The coupling platform presents on one hand a coupling element, arranged adjacent said inner end, said coupling element being movable between a coupling position, adapted to secure the king-pin in the inner end of the aperture, and a position for releasing the king-pin, and on the other hand a locking element which is operable between a locking position, wherein the locking element prevents the coupling element from being removed from its coupling position, and a position, allowing such movement of the coupling element. The coupling platform furthermore comprises two parts, one of which comprises the members required for positioning and securing the coupling platform on the tractor vehicle and in a recess carries the second part, which is easily demountable by means of a connection, accessible substantially from the top side of the platform, said second part containing the inner end of the aperture and carrying the movable coupling element.

10 Claims, 11 Drawing Figures

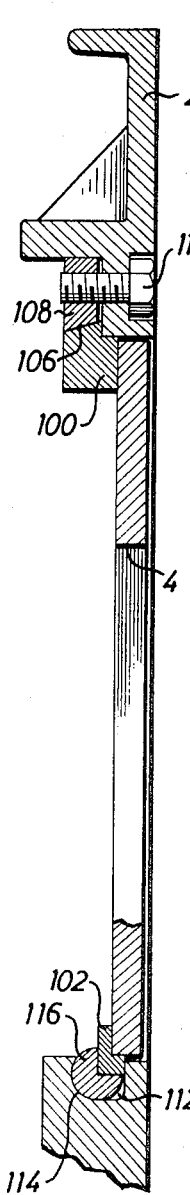
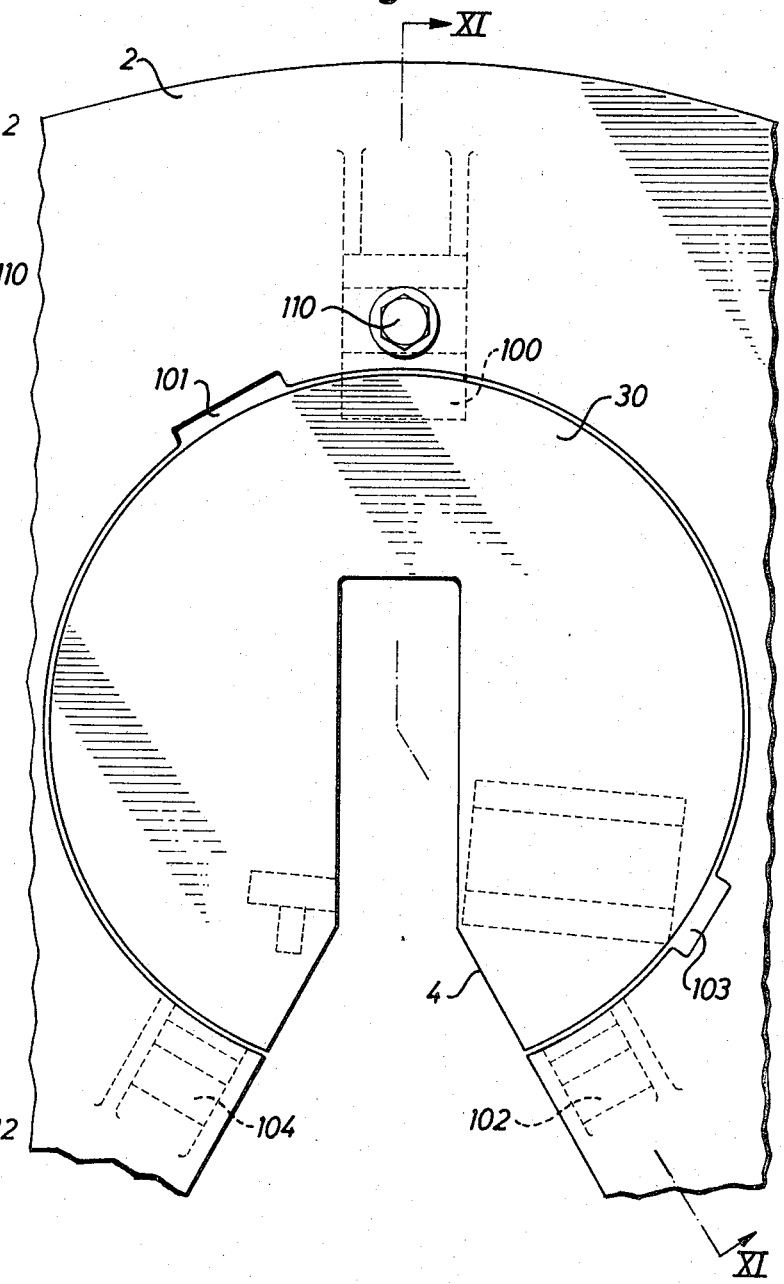

SEMI-TRAILER COUPLING

The present invention relates to a coupling for a semitrailer, said coupling comprising a coupling platform, adapted to be positioned on a tractor vehicle and comprising a substantially elongated aperture, extending from the periphery of the platform in a direction towards the interior of the platform, said aperture at the inner end thereof being adapted to receive a king-pin of the semi-trailer, said coupling platform presents on one hand a coupling element, arranged adjacent said inner end, said coupling element being movable between a coupling position, adapted to secure the king-pin in the inner end of the aperture, and a position for releasing the king-pin, and on the other hand a locking element, which is operable between a locking position, wherein the locking element prevents the coupling element from being removed from its coupling position, and a position, allowing such movement of the coupling element.

Such couplings are exposed to heavy wear and/or stresses of their movable and fixed parts. This requires repeated maintenance, replacement of parts and repairs, which in most cases necessitate complete demounting of the whole platform from the tractor vehicle due to the fact that the abovementioned parts are located internally of the platform and are accessible normally only from the bottom side of the platform. Such a demounting may require several hours.

The object of the present invention has been to considerably facilitate the handling, i.e. maintenance and the like, of platforms.

This object has been attained according to the invention in that the coupling platform comprises two parts, one of which comprises the members required for positioning and securing the coupling platform on the tractor vehicle and in a recess carries the second part, which is easily demountable by means of a connection, accessible substantially from the top side of the platform, said second part containing the inner end of the aperture and carrying the movable coupling element.

The present invention involves that the parts which require repeated maintenance of any kind have been combined to a smaller and lighter unit which is easily demountable from the remaining parts of the platform. By means of a few simple movements this unit can be removed and replaced by a new similar unit within a few minutes, which means a minimum standstill for the proprietor and promotes a central storage and handling of the platform and the parts thereof.

Figure 2:
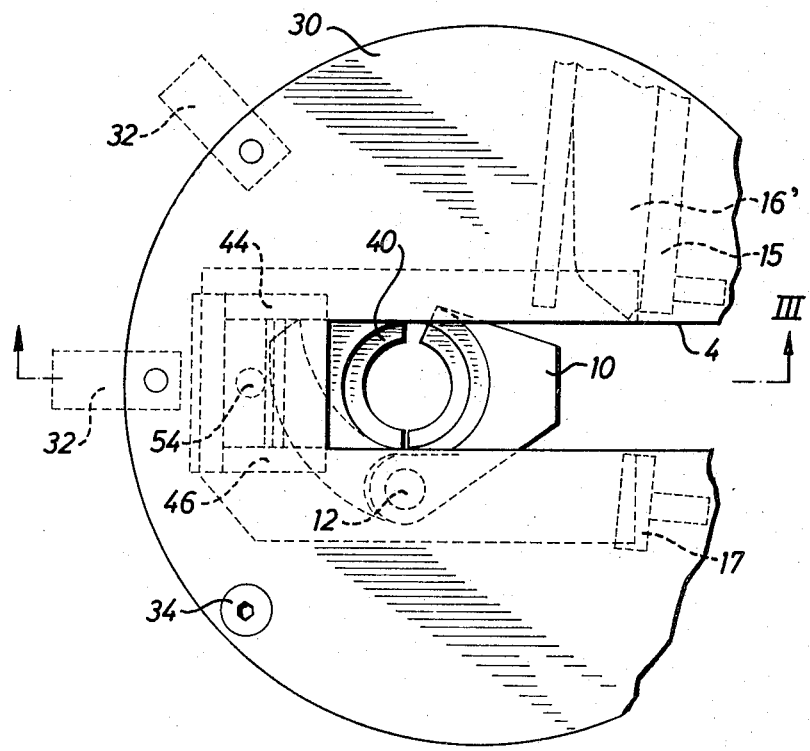
Figure 3:
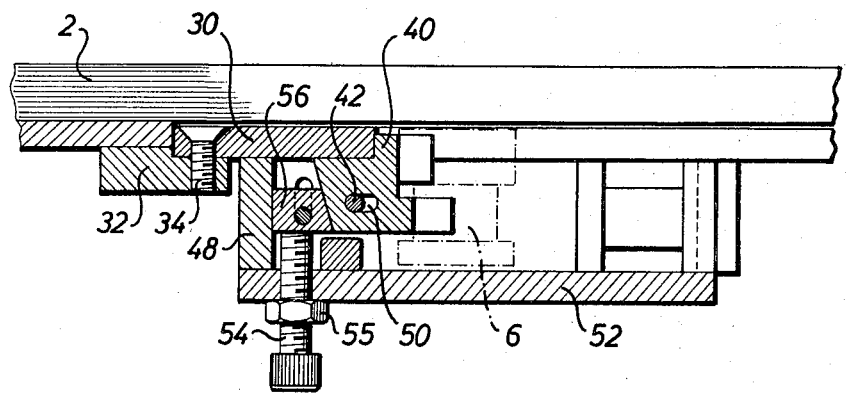

The invention will now be described more closely with reference to the accompanying schematical drawings, on which:

FIG. 1 shows a view from the underside of the central portion of a platform according to the invention, FIG. 2 shows a simplified view above of the same platform with certain parts excluded for the sake of clarity, FIG. 3 shows a section in the direction of the arrows III—III in FIG. 2, and FIGS. 4 – 11 shows various embodiments of members intended for the attachment of the two parts of the platform, FIGS. 5, 7, 9 and 11 showing sections in the directions of the arrows V, VII, IX and XI, respectively, in FIGS. 4, 6, 8 and 10, respectively.

In the various illustrations the same or similarly operating details have been provided with the same reference characters.

The coupling, generally indicated 2, contains a slot shaped aperture 4 which is widening towards the periphery of the platform and is intended to receive the king-pin 6 of a semi-trailer in the direction of the arrow 8. A coupling claw 10 is pivotally supported on a boss 12 in the platform and adapted to grip around the king-pin with its leg indicated 10', when the king-pin 6 is in position at the inner end of the a aperture 4 in the manner illustrated in FIG. 1. The coupling claw is biased away from the position illustrated in FIG. 1 by means of a spring 14. In the position of the coupling claw 10 securing the king-pin 6, the coupling claw is retained by means of a locking wedge, which is reciprocally movable in parallel with the plane of the platform and transversally of the slot shaped aperture 4 in a guide, generally indicated 15 at one side of the aperture 4. This locking wedge is in one of its positions, the locking position, indicated 16 on the drawing and in its retracted position 16'. The locking wedge is biased by means of spring members, not illustrated, towards its locking position. In the locking position the locking wedge 16 also abuts a guide shoulder 17 located at the other side of the aperture 4. In its retracted position 16' the locking wedge is retained by means of a ratchet member 18, which by means of a ratchet finger 20 via an opening 21 in the guide 15 engages in a recess 22 in the locking wedge and thereby maintains the locking wedge in its retracted position. The ratchet member 18 is of U-shape, as illustrated, the ratchet finger 20 at its one end being pivotally connected to one leg of the U-profile. Nearer the base said leg also serves as a seat for the end of a spring 23, by means of which the ratchet member is biased in a clockwise direction in FIG. 1 around a boss 24, extending perpendicularly to the plane of the platform 2. Consequently, the ratchet finger 20 is pressed inwardly towards the recess 22 in the locking wedge 16' due to the tension of the spring 23 at the same time as the locking wedge, which is biased against the locking direction, presses the ratchet finger 20 towards one edge of the opening 21 in the guide 15. At its inner corner, directed away from the ratchet finger 20, the ratchet member 18 pivotally supports one end of a release finger 26, the other end of which extends into the path of movement of the coupling claw 10.

When the king-pin is inserted from outside in the direction of the arrow 8 towards the aperture 4, the king-pin will first, due to the fact that the coupling claw by means of the spring 14 is retained so that its gap is directed outwardly towards the mouth of the aperture 4, meet the leg of the coupling claw indicated 10'' and press thereagainst, so that the coupling claw is pivoted around its axis of rotation 12. In an intermediate position of the pivoting movement of the coupling claw the leg 10'' is brought into contact with the releasing finger 26 and presses said finger against the adjacent leg of the U-profile 18 so that the ratchet member 18 is rotated in a counter-clockwise direction in FIG. 1 around its axis of rotation and thereby the ratchet finger 20 is lifted out of the recess 22 in the locking wedge 16'. The locking wedge is released thereby and due to the bias is moved towards the locking position indicated 16 transversally of the aperture 4 and retains the coupling claw by means of a plane locking surface abutting against a corresponding plane surface on the coupling claw in the manner illustrated. In this position the ratchet finger 20 will abut one side of the locking wedge only with one of its ends due to the action of the biasing spring 23 and as soon as the locking wedge is again retracted to the position indicated 16', the ratchet finger 20 is thereby inserted into the recess 22 so that the coupling wedge is retained in a retracted position and the releasing of the king-pin 6 by the pivoting of the claw 10 is possible. At said pivoting of the coupling claw, as illustrated on the drawing, one leg 10" thereof again abuts the releasing finger 26 from the other direction, the releasing finger 26, however, this time being pivoted freely around its pivot-shaft on the member 18 and not being capable of actuating the latter to any movement. This pivoting movement of the ratchet finger is, however, opposed by a leaf spring 28 fixed to the bottom of the U-section, securing that the releasing finger remains within the area of the path of movement of the coupling claw.

The details 4 – 28 described above are completely supported by and arranged within the frame of a circular plate 30, which is demountable from the remaining parts of the platform 2. The plate 30 is arranged in a circular recess 31 in the platform 2. The plate 30 hereby rests on studs 32, secured to the bottom side of the platform, said studs partly extending into the circular recess 31. Screws 34 are passed through bores in the plate 30 and are screwed into threaded bores in the parts of the studs 32 extending into the circular recess 31.

With reference to FIGS. 2 and 3 the slot-shaped aperture 4 at its inner end presents a wearing block 40, towards which the king-pin 6 is adapted to abut in the coupling position. The wearing block 40 is adjustable in the longitudinal direction of the aperture 4. This has been attained, since the block 40 is supported on and carried by a bolt 42, which at both of its ends is secured in side-walls 44 and 46 of a housing 48, said side-walls being located at either side of the slot aperture 4. The bolt 42 then extends through a hole 50 in the block 40, said hole in cross section having an elongated shape, so that the wearing block is movable on the bolt in the longitudinal direction of the aperture 4. Through the bottom wall 52 of the housing 48 there extends an adjustment screw 54 with a locking nut 55, said adjustment screw with its inner end abutting against an adjustment element 56, which is, in a manner indicated, slidable upwards and downwards in the housing, said adjustment element with an inclined surface cooperating with a corresponding inclined surface on the wearing block 40 from the side thereof directed away from its wearing surface. Setting of the screw 54 presses it against the adjustment element 56, which in turn in a key-like manner presses the wearing block 40 in a right-hand direction in FIGS. 2 and 3, until the bolt 42 abuts the left short side of the hole 50. By means of the arrangement described above an after-adjustment of the wearing block 40 is possible by means of the screw 54, when the wearing block 40 has reached such a wear that the king-pin is no longer securely abutting against the block in the coupling position.

FIGS. 4 – 11 show various embodiments of suitable members for the assembling of the plate 30 easily demountable from the platform.

Figure 4:
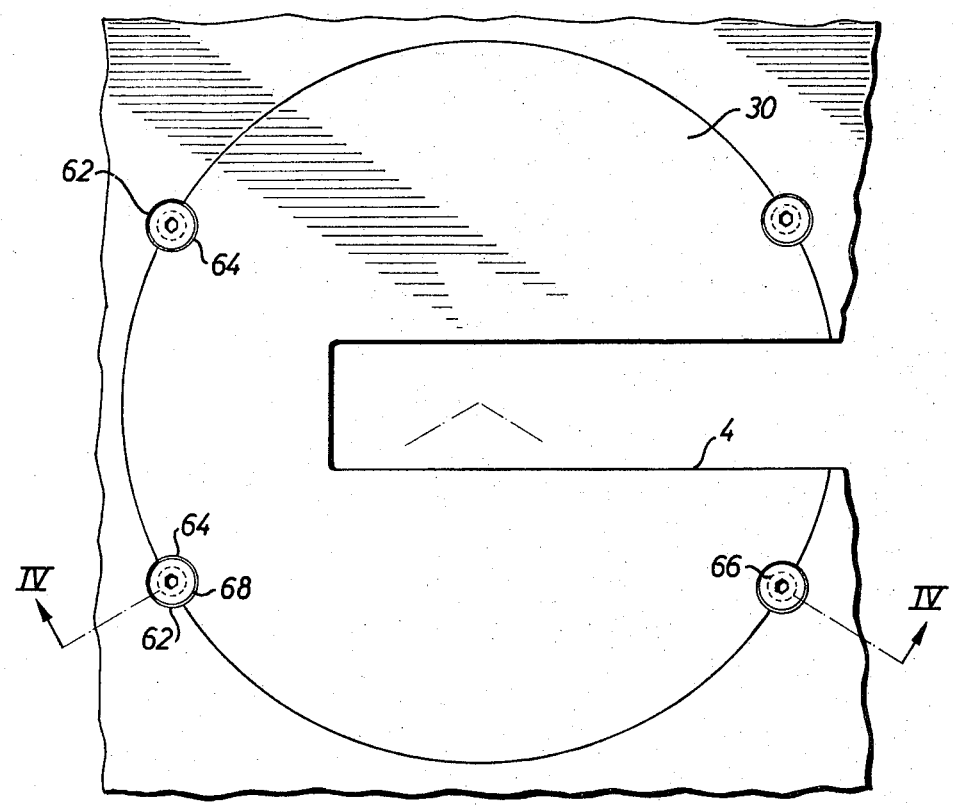
Figure 5:
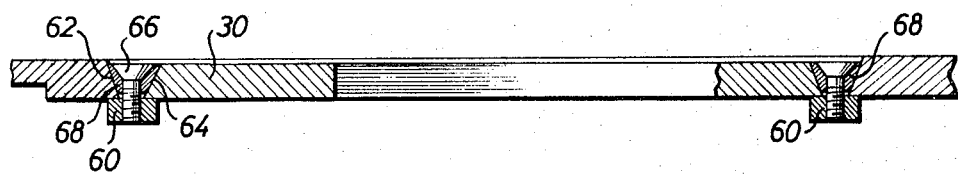

In the embodiment illustrated in FIGS. 4 and 5 the plate 30 rests on four studs 60 secured to the circular opening edge of the platform with through-threaded bores. At these studs generally semi-circular recesses 62 are provided in the edge of the opening and the plate presents four corresponding, semicircular recesses 64 at its periphery. By means of a screw 66, which is threaded into each stud 60, conical wedge elements 68 are wedged into each of the four pairs 62, 64 of semicircular recesses in the plate 30 and the edge of the aperture in the platform respectively whereby a steady securing of the plate is attained.

Figure 6:
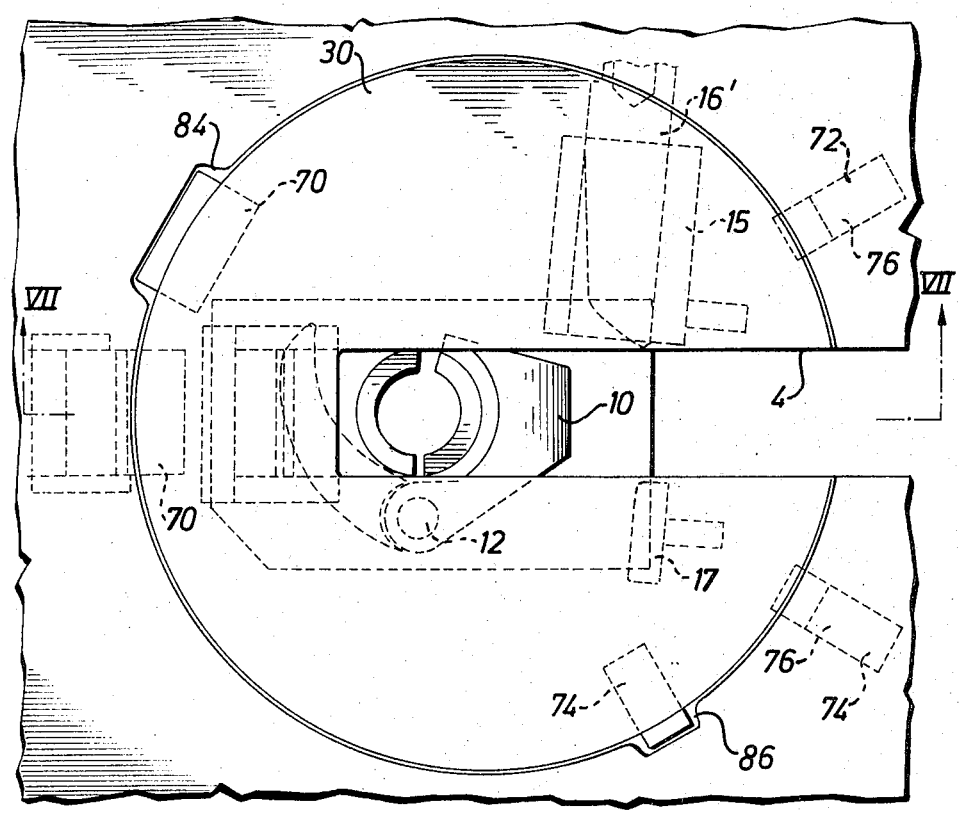
Figure 7:
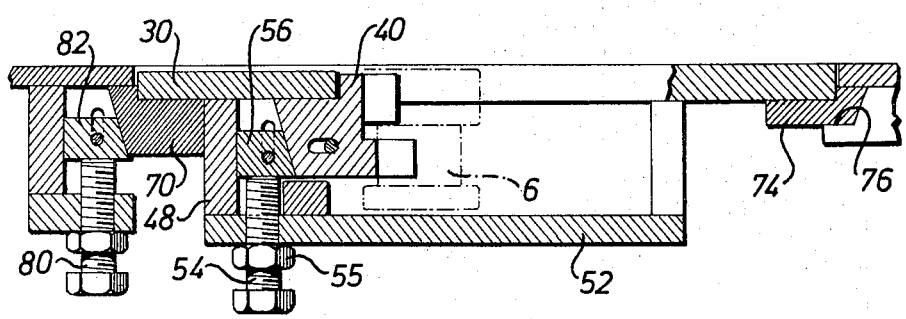

In the embodiment illustrated in FIGS. 6 and 7 the plate 30 presents studs 70, 72 amd 74 at its bottom side, which are distributed around its periphery and which with one edge extend somewhat externally of the periphery of the plate. Two, 72 and 74, of these studs are smaller than the third stud 70, are somewhat wedge-shaped and fit into a recess 76 and 78, respectively, with a corresponding shape at the bottom side of the edge of the circular opening in the platform. The third stud 70 is somewhat larger and more sturdy and is secured in the same manner as described above in regard of the wearing block 40 by means of corresponding screw element 80 and the wedge element 82. It is appreciated that by means of the screw 80 a steady wedging of the plate 30 is the circular opening in the platform is optained. This opening in its edge further presents two recesses 84, 86, the shape of which corresponds to that of the studs 70 and 74 respectively. These recesses 84, 86, in addition to the aperture 4, are intended to allow the insertion and removal of the platform in spite of the studs 70, 72, 74, which must then be pivoted to or from said recesses or the aperture 4, respectively, below the circular opening edge.

Figure 8:
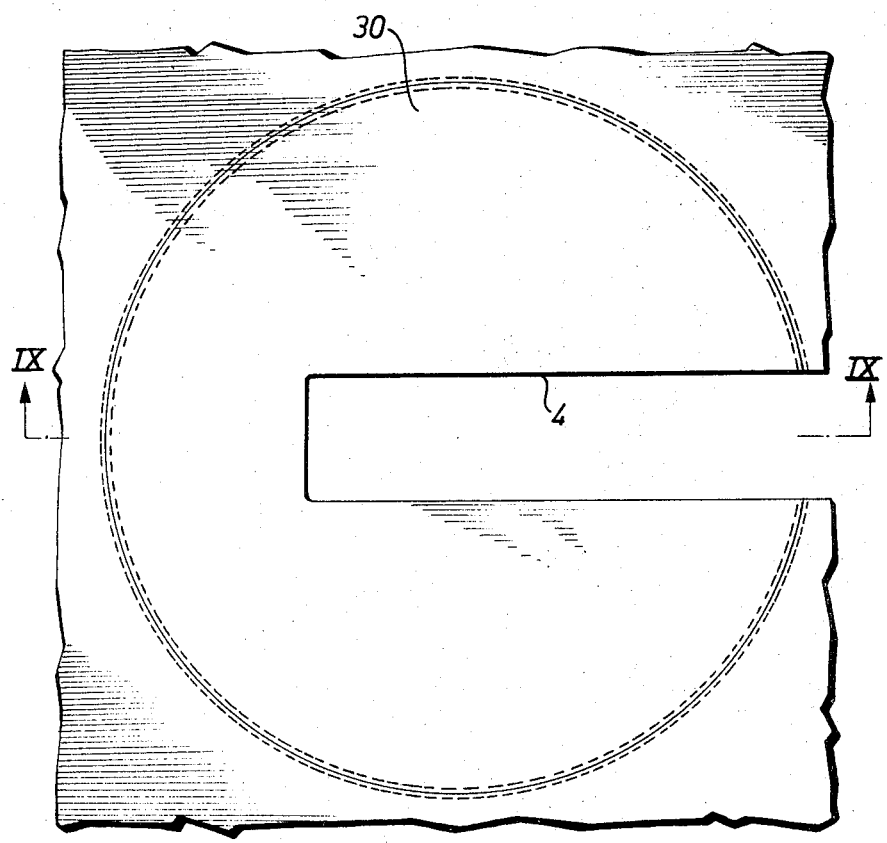
Figure 9:

In FIG. 8 and 9 an embodiment is illustrated, wherein the plate 30 and the semi-circular opening in the platform present one groove each 90 and 92, respectively, said grooves being positioned in register with each other in the edge of the plate and the edge of the opening, respectively. From the slot-shaped aperture a flexibly elastic rod 94, with a cross-section corresponding the two opposite grooves 90, 92 together, can be inserted into the grooves so that it extends around the whole periphery of the plate 30. Thereby the plate 30 is secured in the opening.

In FIGS. 10 and 11, finally, an embodiment is illustrated, wherein again the plate 30 presents three extending studs 100, 102, 104 along its periphery, two of which are smaller than the third 100, which presents an inclined surface 106, adapted to cooperate with a wedge element 108, which is drawn towards the surface by means of a screw 110, accessible from the top side of the platform. The two smaller studs 102, 104 are adapted to engage in a recess between a groove 112 with a semi-circular bottom 114 in the circular opening in the edge of the platform and an element 116, which, in cross-section, is shaped like three quarters of a circle, said element being pivotally located in the groove 112 in the manner illustrated in FIG. 11. It is appreciated that at the setting of the screw 110 and the accompanying wedging of the plate at the three securing positions an automatic positioning of the plate 30 is optained in the best manner due to the elements 116, which are rotatable in the two grooves 112.

At 101 and 103 recesses in the edge of the circular opening are illustrated, which together with the aperture 4 are adapted to allow insertion and removal of the plate 30 into and out of the circular opening by reception of the studs 100, 102 and 104, respectively.

It is common for the embodiments illustrated above that they allow an extremly simple demounting and insertion of the plate 30 in the platform.

The present invention is, of course, not limited to the embodiments described above and illustrated on the drawings but can be modified within the scope of the following claims.

I claim:

1. A coupling for attaching a semi-trailer to a tractor vehicle, said coupling comprising a coupling platform, adapted to be positioned on the tractor vehicle and comprising a substantially elongated aperture extending from the periphery of the platform in a direction towards the interior of the platform, said aperture at the inner end thereof being adapted to receive a king-pin of the semi-trailer, said coupling platform presenting on the one hand a coupling element, arranged adjacent said inner end, said coupling element being movable between a coupling position, adapted to secure the king-pin in the inner end of the aperture, and a position for releasing the king-pin, and on the other hand a locking element which is operable between a locking position, wherein the locking element prevents the coupling element from being removed from its coupling position, and a position for allowing such movement of the coupling element, characterized in that the coupling platform comprises two coupling platform parts, the first of which includes the members required for positioning and securing the coupling platform on the tractor vehicle and is provided with a recess, the second of which contains the inner end of the aperture and carries the movable coupling element, and connecting means for demountably connecting said first part to said second part with accessibility substantially from the top side of the platform, said connecting means including shoulder elements at the edge of said recess, said shoulder elements having wedge surfaces, and cooperating wedge surfaces on the second of said coupling platform parts.

2. A coupling as claimed in claim 1, wherein said second coupling platform part has on its lower side stud means with a wedge surface projecting beyond its periphery under the peripheral edge of said recess, and fastening means having a wedge surface that is movable towards the wedge surface of said stud means, moving means accessible from the top side of the platform for moving said fastening means, said second coupling platform part resting via the wedge surface of said stud means on the wedge surface of said fastening means.

3. A coupling as claimed in claim 2, wherein the second coupling platform part presents a circular periphery and is arranged in a corresponding circular opening forming said recess in said first part, said opening having in its edge notch means for receiving said study means when mounting said second part, said fastening means being positioned peripherally spaced from said notch means.

4. A coupling as claimed in claim 1 wherein the edge of said recess in said first coupling platform part for said second coupling platform part is provided with a groove, a bearing element pivotally located in said groove, said bearing element being provided with a cut out so located as to define a receiving gap between the bearing element and the upper wall of said groove, a stud depending from the lower side of said second platform part and projecting beyond its periphery into said receiving gap.

5. A coupling as claimed in claim 1, wherein said locking element is spring biased towards the locking position thereof and is locked in the position allowing movement of the coupling element, by means of a ratchet device, which is adapted to be actuated by the movement of the coupling element towards the coupling position so as to release the locking element, so that it can be moved freely towards the locking position under the action of the spring bias thereof, characterized in that the ratchet device as well is carried by the second part of the coupling platform.

6. A coupling as claimed in claim 5, characterized in that the ratchet device comprises a ratchet element, which is pivotally supported on the second part of the coupling platform, said ratchet element presenting a pawl, adapted to engage the locking element in the position thereof releasing the coupling element, said ratchet element being spring biased towards said ratchet position and in addition pivotally supporting a releasing element, extending into the path of movement of the coupling element and upon movement of the coupling element towards the coupling position being adapted to be forced by means of the coupling element towards a shoulder on the ratchet element, so that the latter is caused to be pivoted therewith against the action of the spring bias thereof and release the locking element, and wherein the releasing element upon the movement of the coupling element from the releasing position is adapted to be caused to be pivoted from the shoulder around the pivot axis thereof on the ratchet element without actuating the latter to any significant movement.

7. The coupling as claimed in claim 6, characterized in that a spring element is adapted to oppose at least the later part of the pivoting movement of the releasing element away from the shoulder caused by the coupling element.

8. The coupling as claimed in claim 1, wherein the locking element is formed by a locking wedge, which is movable longitudinally thereof towards the locking position and is spring biased, said locking wedge in the locking position extending transversally across the aperture and locking element in the coupling position thereof by abutting by means of a locking surface against its corresponding surface on the coupling element, characterized in that the locking wedge is supported by the first part of the coupling platform and that the second part carries guides for the locking wedge.

9. The coupling as claimed in claim 6, characterized in that the pawl of the ratchet element is formed by a pawl finger, which at one end thereof is pivotally arranged on the ratchet element and with the upper end thereof is inserted through an opening in one of said guides for the locking wedge, whereby in the ratchet position the pawl finger is pressed towards the edge of the opening by means of the spring biased locking wedge and simultaneously, due to the spring biasing of the ratchet element, is pressed longitudinally thereof against the locking wedge.

10. A coupling for attaching a semi-trailer to a tractor vehicle, said coupling comprising a coupling platform adapted to be positioned on the tractor vehicle and comprising an aperture extending from the periphery of the platform in a direction towards the interior of the platform, said aperture at the inner end thereof being adapted to receive a king-pin of the semi-trailer, said coupling platform presenting on one hand a coupling element, arranged adjacent said inner end, said coupling element being removable between a coupling position, adapted to secure the king-pin in the inner end of the aperture, and a position for releasing the king-pin, and on the other hand a locking element which is operable between a locking position, wherein the locking element prevents the coupling element from being removed from its coupling position, and a position for allowing such movement of the coupling element, characterized in that there is a wearing block for the king-pin at the inner end of the aperture for the king-pin, said wearing block having an elongated hole, a bolt connected with said second coupling platform part and extending transversely relatively the longitudinal direction of said aperture and through said elongated hole of said wearing block, said elongated hole having an elongated cross-section in the direction of movement of said wearing block, a wedge surface on said wearing block directed away from the wearing surface, a wedge element cooperating with said wedge surface and means for adjusting transversely of the plane of the coupling platform said wedge element to move said wearing block.

\* \* \* \* \*

UNITED STATES PATENT OFFICE
CERTIFICATE OF CORRECTION

Patent No. 3,830,523  Dated August 20, 1974

Inventor(s) Martn Morichetto

It is certified that error appears in the above-identified patent and that said Letters Patent are hereby corrected as shown below:

On the cover sheet item [73] "Slapvagskopplingar" should read -- Slapvagnskopplingar --; item [30] "Dec. 3, 1971 Switzerland" should read -- Dec. 3, 1971 Sweden --.

Signed and sealed this 3rd day of December 1974.

(SEAL)
Attest:

McCOY M. GIBSON JR.
Attesting Officer

C. MARSHALL DANN
Commissioner of Patents